(12) United States Patent
Molesini et al.

(10) Patent No.: US 11,994,204 B2
(45) Date of Patent: May 28, 2024

(54) GEAR ASSEMBLY FOR AERONAUTICAL ENGINE WITH LUBRICANT STORING POCKETS

(71) Applicant: GE Avio S.r.l., Turin (IT)

(72) Inventors: Pietro Molesini, Castelnuovo del Garda (IT); Saypen Baraggia Au Yeung, Valenza (IT); Miriam Manzoni, Sesto San Giovanni (IT)

(73) Assignee: GE AVIO S.R.L., Rivalta di Torino (IT)

( * ) Notice: Subject to any disclaimer, the term of this patent is extended or adjusted under 35 U.S.C. 154(b) by 187 days.

(21) Appl. No.: 17/355,282

(22) Filed: Jun. 23, 2021

(65) Prior Publication Data

US 2022/0049765 A1 Feb. 17, 2022

(30) Foreign Application Priority Data

Jun. 23, 2020 (IT) .......................... 102020000015064

(51) Int. Cl.
*F16H 57/04* (2010.01)
(52) U.S. Cl.
CPC ....... *F16H 57/0423* (2013.01); *F16H 57/045* (2013.01); *F16H 57/046* (2013.01); *F16H 57/0495* (2013.01); *F05D 2220/323* (2013.01)
(58) Field of Classification Search
CPC .. F16H 57/0423; F16H 57/045; F16H 57/046; F16H 57/0495; F16H 57/0479; F16H 1/2827; F02C 7/36; F01D 25/18
See application file for complete search history.

(56) References Cited

U.S. PATENT DOCUMENTS

| 4,378,197 | A | 3/1983 | Cattaneo et al. | |
| 6,039,667 | A * | 3/2000 | Schunck | F16H 57/0427 |
| | | | | 184/6.12 |
| 6,223,616 | B1 | 5/2001 | Sheridan | |
| 7,704,178 | B2 | 4/2010 | Sheridan et al. | |
| 8,484,942 | B1 | 7/2013 | McCune et al. | |
| 8,708,863 | B2 | 4/2014 | McCune et al. | |

(Continued)

FOREIGN PATENT DOCUMENTS

| CN | 106461064 A | 2/2017 |
| CN | 110185775 A | 8/2019 |

(Continued)

*Primary Examiner* — Thomas C Diaz
(74) *Attorney, Agent, or Firm* — Venable LLP; Kurt W. R. Bessel; Michele V. Frank

(57) ABSTRACT

A gear assembly for an aeronautical engine includes a first gear disposed at a centerline axis of the gear assembly, a second gear coupled to the first gear in adjacent radial arrangement to form a first mesh between the first gear and the second gear, a static portion coupled to the second gear in adjacent circumferential arrangement, the static portion defining a pocket, and a spraybar disposed within the static portion such that a supply opening of the spraybar is directed at the first mesh between the first gear and the second gear. The supply opening provides a flow of lubricant to the first mesh between the first gear and the second gear and at least a portion of the flow of lubricant is collected by the pocket. The flow of lubricant is continuously released from the pocket to the gear system.

18 Claims, 4 Drawing Sheets

(56) References Cited

U.S. PATENT DOCUMENTS

| | | | |
|---|---|---|---|
| 8,747,272 B2* | 6/2014 | Imai | B64C 25/405 |
| | | | 475/159 |
| 8,968,141 B2 | 3/2015 | Duong et al. | |
| 9,038,779 B2* | 5/2015 | McCune | F16H 57/0423 |
| | | | 184/6.11 |
| 9,121,491 B2* | 9/2015 | Hancox | F16H 57/0486 |
| 2014/0255162 A1 | 9/2014 | DiBenedetto | |
| 2016/0363211 A1 | 12/2016 | Bradley | |
| 2016/0377167 A1 | 12/2016 | Sheridan | |
| 2017/0108110 A1 | 4/2017 | Sheridan | |
| 2017/0307061 A1 | 10/2017 | Gravina et al. | |
| 2019/0113127 A1 | 4/2019 | Gravina | |
| 2020/0080494 A1 | 3/2020 | Yoshiomi et al. | |
| 2020/0103019 A1 | 4/2020 | Manzoni et al. | |

FOREIGN PATENT DOCUMENTS

| | | | |
|---|---|---|---|
| EP | 2559914 A1 | 2/2013 | |
| EP | 3578857 A1 | 12/2019 | |

* cited by examiner

GEAR ASSEMBLY FOR AERONAUTICAL ENGINE WITH LUBRICANT STORING POCKETS

GOVERNMENT SPONSORED RESEARCH

The project leading to this application has received funding from the Clean Sky 2 Joint Undertaking under the European Union's Horizon 2020 research and innovation program under grant agreement No. CS2-LPA-GAM-2018/2019-01.

CROSS REFERENCE TO RELATED APPLICATIONS

The present application claims priority to Italian Application No. 102020000015064 filed Jun. 23, 2020, which is hereby incorporated by reference in its entirety.

FIELD

The present subject matter relates generally to a gear drive system, or more particularly to a gear drive system including a gear assembly with a lubricant storing pocket.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Mechanical and electro-mechanical systems, such as gas turbine engines or other engines, include gear assemblies to change an input or output rotational speed between two or more shafts such as to optimize turbine engine efficiency and performance. Gear assemblies are also used to move accessories and/or propellers or rotors. For example, gear assemblies are used to decouple turbine and fan shafts in turbofan engines and are used to decouple a gas turbine from a propeller in turboprop engines.

Lubricant systems for such gear assemblies are designed to supply lubricant injected into gear meshes. However, a primary lubrication system may be interrupted from providing a lubricant to the gear assembly for several seconds, e.g., an oil interruption event, or longer times, e.g., an oil off event. To avoid gear and bearing failure or damage, additional parts are needed such as auxiliary systems to provide lubricant during such interruption periods. Conventional systems to provide lubrication during interruption periods require additional parts, such as auxiliary systems, and require dedicated hardware and pre-flight filling/discharging activities to operate.

BRIEF DESCRIPTION

Aspects and advantages of the invention will be set forth in part in the following description, or may be obvious from the description, or may be learned through practice of the invention.

In one exemplary embodiment of the present disclosure, a gear assembly is provided. The gear assembly includes a first gear disposed at a centerline axis of the gear assembly; a second gear coupled to the first gear in adjacent radial arrangement to form a first mesh between the first gear and the second gear; a static portion coupled to the second gear in adjacent circumferential arrangement, the static portion defining a pocket; and a spraybar disposed within the static portion such that a supply opening of the spraybar is directed at the first mesh between the first gear and the second gear, wherein the supply opening is configured to provide a flow of lubricant to the first mesh between the first gear and the second gear and at least a portion of the flow of lubricant is collected by the pocket.

In certain exemplary embodiments the gear assembly includes a third gear coupled to the second gear in adjacent radial arrangement to form a second mesh between the second gear and the third gear, wherein the flow of lubricant is released from the pocket to the second mesh between the second gear and the third gear during an interruption condition of a primary lubrication system in which the flow of lubricant is interrupted from being provided to the supply opening, and wherein the primary lubrication system provides the flow of lubricant to the supply opening during a working condition.

In certain exemplary embodiments the static portion defines a flow aperture spaced from the pocket, and wherein the flow of lubricant released from the pocket flows through the flow aperture to the second mesh between the second gear and the third gear also during the interruption condition.

In certain exemplary embodiments the pocket includes an inlet and an outlet, and wherein the inlet of the pocket is larger than the flow aperture so that the flow of lubricant from the supply opening is first collected by the pocket.

In certain exemplary embodiments the flow of lubricant flows into the pocket via centrifugal force and windage effects between the first gear and the second gear.

In certain exemplary embodiments the flow of lubricant is released from the pocket to the second mesh between the second gear and the third gear also during the interruption condition via a pumping effect of the second gear.

In certain exemplary embodiments the first gear is a sun gear rotatable around the centerline axis of the gear assembly, the second gear is a star gear coupled to the sun gear, and the third gear is a ring gear coupled to the star gear.

In another exemplary embodiment of the present disclosure, a mechanical or electro-mechanical system including an aeronautical engine having a gear assembly is provided. The gear assembly includes a first gear disposed at a centerline axis of the gear assembly; a second gear coupled to the first gear in adjacent radial arrangement to form a first mesh between the first gear and the second gear; a static portion coupled to the second gear in adjacent circumferential arrangement, the static portion defining a pocket; and a spraybar disposed within the static portion such that a supply opening of the spraybar is directed at the first mesh between the first gear and the second gear, wherein the supply opening is configured to provide a flow of lubricant to the first mesh between the first gear and the second gear and at least a portion of the flow of lubricant is collected by the pocket.

In certain exemplary embodiments the system includes a primary lubrication system in communication with the gear assembly, the primary lubrication system transitionable between a working condition in which the flow of lubricant is provided to the supply opening and an interruption condition in which the flow of lubricant is interrupted from being provided to the supply opening.

In certain exemplary embodiments the system includes a third gear coupled to the second gear in adjacent radial arrangement to form a second mesh between the second gear and the third gear, wherein the flow of lubricant is released from the pocket to the second mesh between the second gear and the third gear also when the primary lubrication system is in the interruption condition.

In certain exemplary embodiments the static portion defines a flow aperture spaced from the pocket, and wherein the flow of lubricant released from the pocket flows through the flow aperture to the second mesh between the second gear and the third gear when the primary lubrication system is in the interruption condition.

In certain exemplary embodiments the pocket includes an inlet and an outlet, and wherein the inlet of the pocket is larger than the flow aperture so that the flow of lubricant from the supply opening is first collected by the pocket.

In certain exemplary embodiments the flow of lubricant flows into the pocket via centrifugal force and windage effects between the first gear and the second gear.

In certain exemplary embodiments the flow of lubricant is released from the pocket to the second mesh between the second gear and the third gear also during the interruption condition via a pumping effect of the second gear.

In certain exemplary embodiments the first gear is a sun gear rotatable around the centerline axis of the gear assembly, the second gear is a planet gear coupled to the sun gear, and the third gear is a ring gear coupled to the planet gear.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
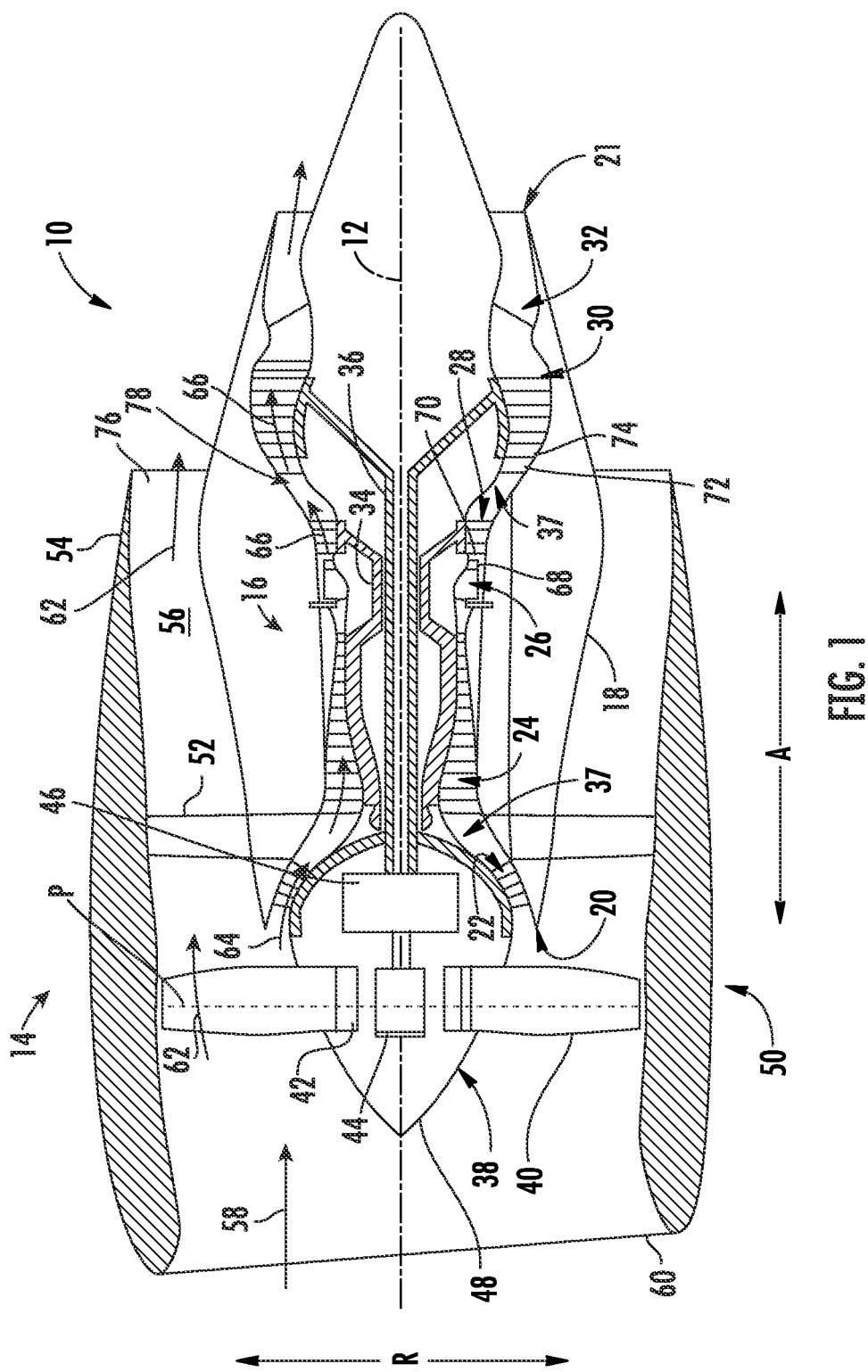
FIG. 1 is a schematic, cross-sectional view of an exemplary gas turbine engine in accordance with exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Epicyclic gearboxes integrated in modern aeroengines require continuous lubrication to transmit power. In special off-design or interruption conditions, a lubrication supply may be interrupted for several seconds or more. To avoid gear and bearing failure or damage, conventional systems use additional auxiliary systems. However, such additional systems require dedicated hardware and/or pre-flight filling/discharging activities to operate. A gear assembly of the present disclosure utilizes structure integrated into a static portion of the gear assembly to provide lubrication to the gear assembly, e.g., an epicyclic gearbox, for a few seconds during interruption conditions. In this manner, a gear assembly of the present disclosure does not require any external connections or additional parts as are needed in conventional systems.

A gear assembly of the present disclosure provides a system for collecting and storing a lubricant during a working condition of a primary lubrication system in which a flow of lubricant is provided to a supply opening of a spraybar. For example, during a working condition of the primary lubrication system, a flow of lubricant travels through a supply channel and out a supply opening of a spraybar to a first mesh between a first gear and a second gear. Next, the flow of lubricant flows into a pocket of a gear assembly of the present disclosure via centrifugal force and windage effects between the first gear and the second gear. In this manner, a gear assembly of the present disclosure is capable of storing a portion of the flow of lubricant during a working condition of the primary lubrication system within the pocket of the static portion for later use to lubricate the system during an interruption condition.

A gear assembly of the present disclosure is able to release the flow of lubricant stored within a pocket of a static portion of the gear assembly during an interruption condition of the primary lubrication system. During an interruption condition, the flow of lubricant is interrupted from being provided to the supply opening of the spraybar by the primary lubrication system.

The flow of lubricant is released from the pocket of the gear assembly of the present disclosure to a second mesh between a second gear and a third gear of the present disclosure during an interruption condition of the primary lubrication system via a pumping effect of the second gear and gravity (when acting). In this manner, a gear assembly of the present disclosure is able to continuously lubricate the gears and meshes of a gear system during an interruption condition of the primary lubrication system without requiring additional parts, auxiliary systems, and/or tanks. In other words, a gear assembly of the present disclosure utilizes a pocket within a static portion of the gear assembly to store residual lubricant and take advantage of a fluid dynamic field generated by the gears of the present disclosure to allow lubrication of the system during an interruption condition through the gears pumping effect and gravity (when acting).

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." Although FIG. 1 illustrates a turbofan configuration, a gear assembly of the present disclosure is compatible with other configurations, such as a turboprop or other configurations, as described below. As shown in FIG. 1, the turbofan engine 10 defines an axial direction A (extending parallel to a longitudinal centerline 12 provided for reference) and a radial direction R. In general, the turbofan 10 includes a fan section 14 and a turbomachine 16 disposed downstream from the fan section 14. In an exemplary embodiment, the engine 10 includes a gear assembly or power gear box 46 having a plurality of gears for decoupling a gas turbine shaft from a fan shaft. The position of the power gear box 46 is not limited to that as shown in the exemplary embodiment of turbofan 10. For example, the position of the power gear box 46 may vary along the axial direction A.

In other exemplary embodiments, a gear assembly of the present disclosure may be included in a turboprop configuration, wherein a gear box decouples a gas turbine from a propeller.

It is also contemplated that a gear assembly of the present disclosure is able to be utilized in any mechanical or electro-mechanical system, such as gas turbine engines, piston engines, turbofan engines, turboprop engines, other gear drive systems, and/or rotor drive systems.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Other embodiments may feature different turbomachine configurations. For example, an LP turbine that is not directly connected to an LP compressor, e.g., in a decoupling gear box configuration. Additionally, the compressor section, combustion section 26, and turbine section together define at least in part a core air flowpath 37 extending therethrough.

A gear assembly of the present disclosure is compatible with standard fans, variable pitch fans, or other configurations. For the embodiment depicted, the fan section 14 may include a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a gear assembly or power gear box 46. A gear assembly 46 may enable a speed change between a first shaft, e.g., LP shaft 36, and a second shaft, e.g., LP compressor shaft and/or fan shaft. For example, in one embodiment, the gear assembly 46 may be disposed in an arrangement between a first shaft and a second shaft such as to reduce an output speed from one shaft to another shaft.

More generally, the gear assembly 46 can be placed anywhere along the axial direction A to decouple the speed of two shafts, whenever it is convenient to do so from a component efficiency point of view, e.g., faster LP turbine and slower fan and LP compressor or faster LP turbine and LP compressor and slower fan, or it is required to do so due to technology limits, e.g., propeller tip speed in turboprops require much lower speed with respect to gas turbine shafts speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, an engine of the present disclosure may be part of an airplane engine or a helicopter engine. In other exemplary embodiments, any other suitable engine may be utilized with a gear assembly of the present disclosure. For example, in other embodiments, the engine may be any other suitable gas turbine engine, such as a turbofan engine, turboprop engine, turbojet engine, any other suitable turboshaft engine, etc. In such a manner, it will further be appreciated that in other embodiments the gas turbine engine may have any other suitable configuration, such as any other suitable number or arrangement of shafts, compressors, turbines, fans, etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of combustion engine, such as reciprocating engines.

Referring now to FIGS. 2-5, a schematic drawing of a gear assembly 100 for an aeronautical engine, e.g., a gas turbine engine, in accordance with an exemplary aspect of the present disclosure is provided. In at least certain exemplary embodiments, the exemplary gear assembly 100 depicted in FIGS. 2-5 may be incorporated into, e.g., the exemplary engine 10 described above with reference to FIG. 1 (e.g., may be incorporated into the gear assembly 46 depicted in FIG. 1 and described above, or in other positions along the axial direction A depending on the turbofan engine architecture, or in other configurations such as turboprop engines, or other gear drive systems).

Figure 2:
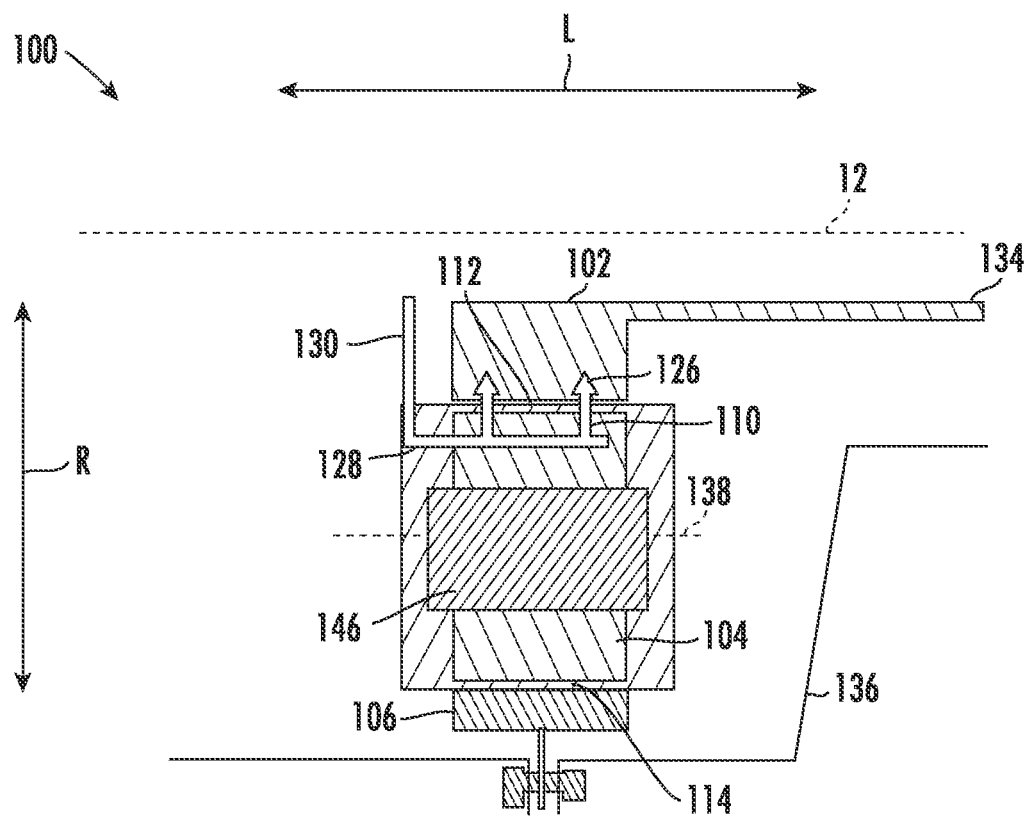
FIG. 2 is a schematic, side cross-sectional view of a gear assembly in accordance with an exemplary embodiment of the present disclosure.
Figure 3:
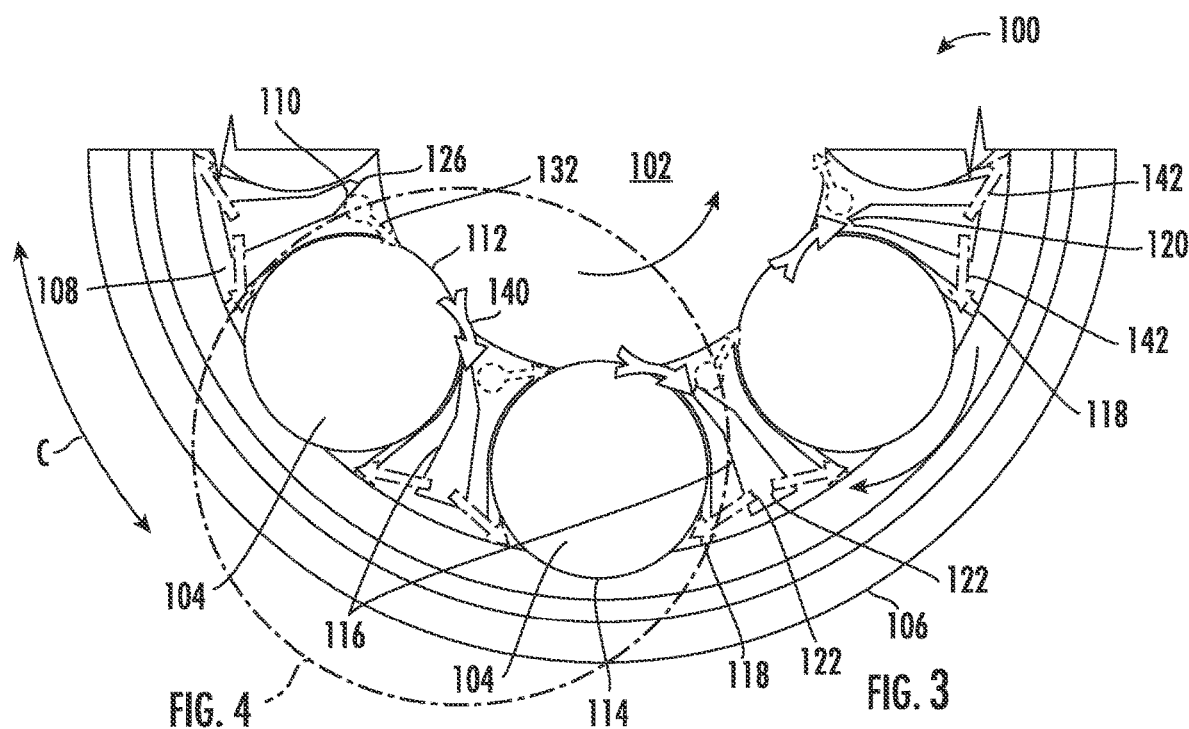
FIG. 3 is a schematic, front view of a gear assembly in accordance with an exemplary embodiment of the present disclosure.
Figure 4:
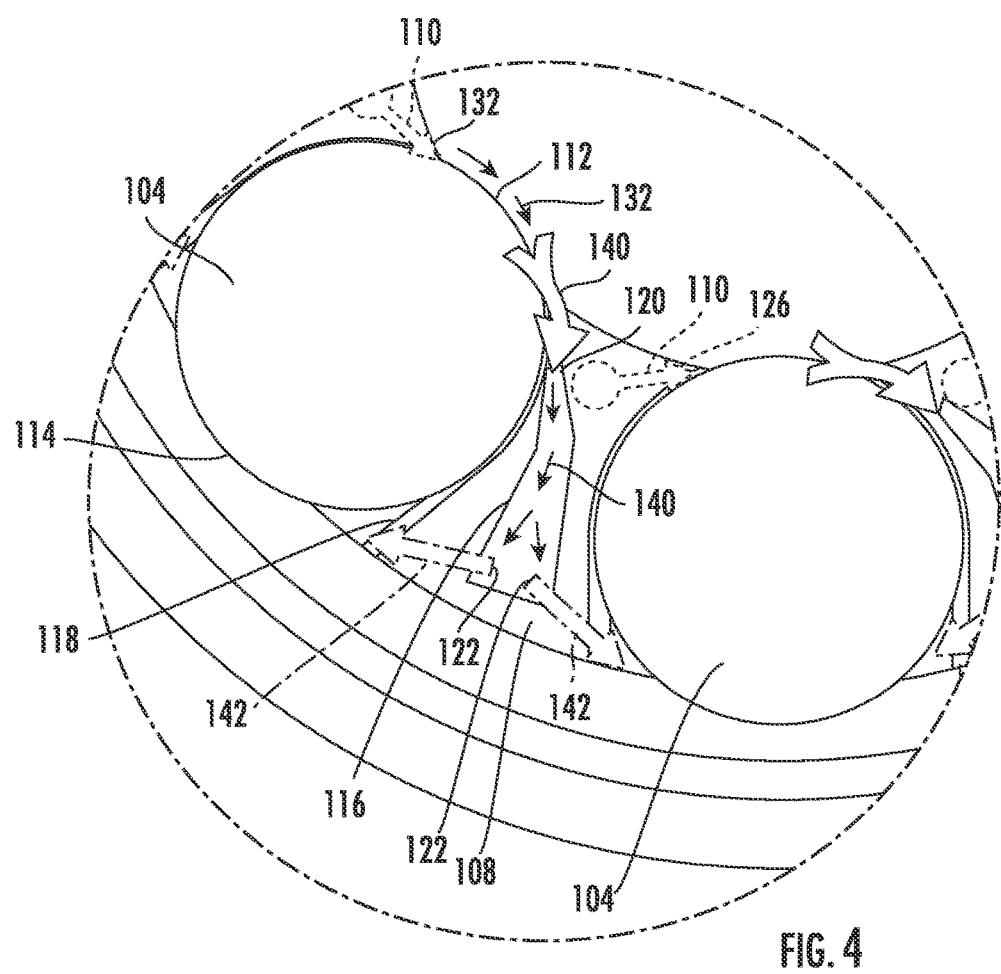
FIG. 4 is a detailed schematic, front view of a gear assembly in accordance with an exemplary embodiment of the present disclosure.
Figure 5:
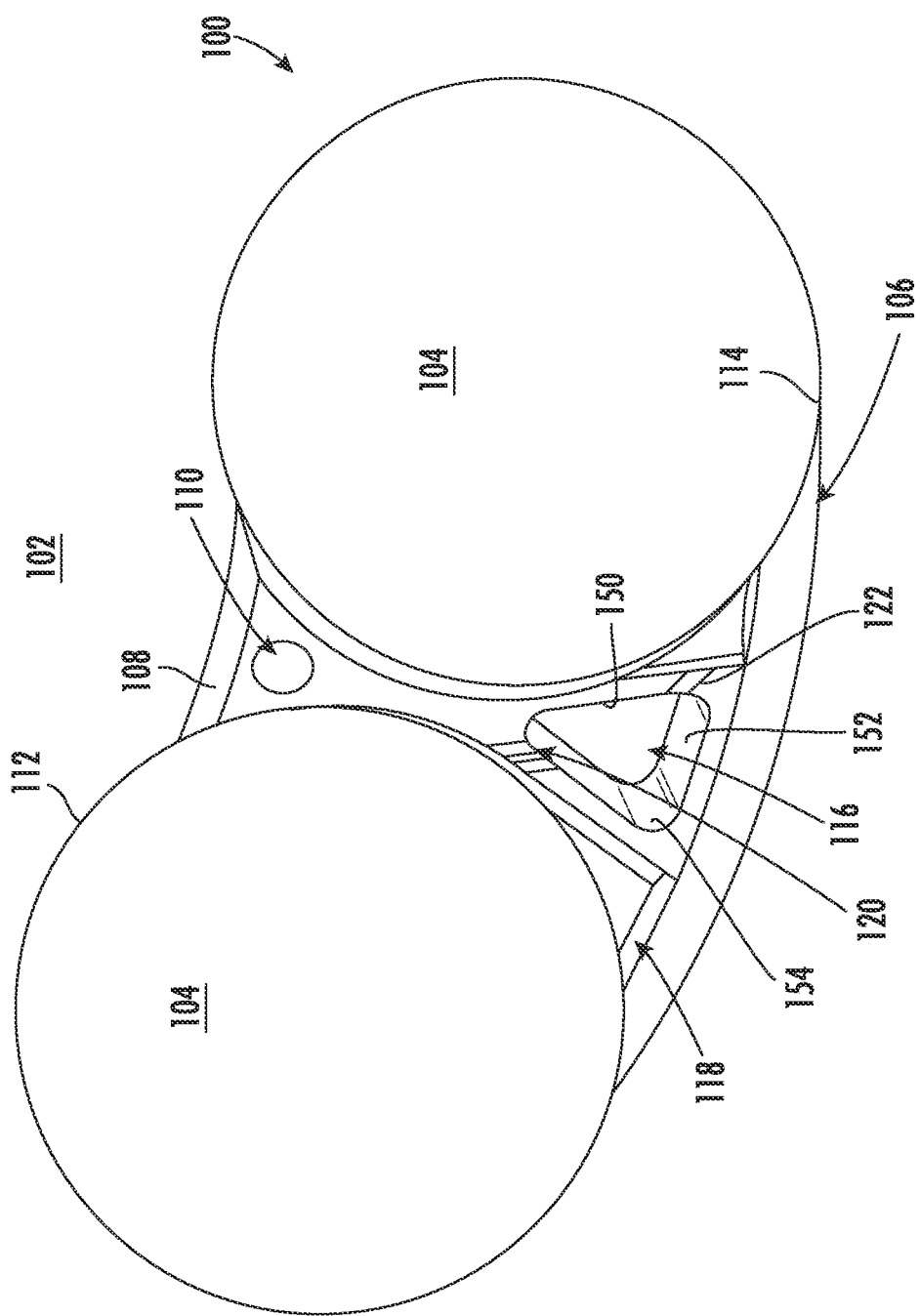
FIG. 5 is a detailed schematic, front view of a gear assembly in accordance with an exemplary embodiment of the present disclosure.

Referring to FIGS. 2-5, an exemplary embodiment of a gear assembly 100 according to an aspect of the present disclosure is provided. FIG. 2 provides a longitudinal side view of a gear assembly 100 of the present disclosure and FIGS. 3-5 provide a circumferential view of the gear assembly 100 of the present disclosure. The gear assembly 100 defines a longitudinal direction L co-directional to a reference longitudinal centerline axis 12 extended through the gear assembly 100. A reference radial direction R is extended from the centerline axis 12. A reference circumferential direction C is extended relative to the centerline axis 12. FIGS. 2-5 schematically show a portion of a gear assembly 100 of the present disclosure.

Referring to FIGS. 2-5, in an exemplary embodiment, a gear assembly 100 of the present disclosure generally includes a first gear 102, a second gear 104, a third gear 106, a static portion 108, and a spraybar 110. In one embodiment, the static portion 108 may be a static structure of the gear assembly 100 that is used as a support for lubrication. In other embodiments, the portion 108 may have other configurations.

In one embodiment, the first gear 102 is disposed at the centerline axis 12 of the gear assembly 100. The second gear 104 is coupled to the first gear 102 in adjacent arrangement along the radial direction R to form a first mesh 112 between the first gear 102 and the second gear 104. The third gear 106 is coupled to the second gear 104 in adjacent arrangement along the radial direction R to form a second mesh 114 between the second gear 104 and the third gear 106.

Referring to FIGS. 3-5, in one embodiment, a static portion 108 is coupled to the second gear 104 in adjacent arrangement along the circumferential direction C. For example, a static portion 108 may be disposed between adjacent second gears 104 as shown in FIGS. 3-4. In an exemplary embodiment, the static portion 108 defines a pocket 116 and a flow aperture 118 spaced away from the pocket 116. The pocket 116 disposed within the static portion 108 includes an inlet 120 and an outlet 122.

Referring to FIG. 5, in an exemplary embodiment, the pocket 116 includes flow guiding sidewalls 150, flow guiding bottom wall 152, and curved flow guiding connecting walls 154. The curved flow guiding connecting walls 154 are located between respective flow guiding sidewalls 150 and flow guiding bottom wall 152. The flow guiding sidewalls 150, flow guiding bottom wall 152, and curved flow guiding connecting wall 154 are shaped to direct a flow of lubricant to and out outlet 122 of pocket 116. In one embodiment, the inlet 120 of pocket 116 includes an inlet hole or aperture 120. In one embodiment, the outlet 122 of pocket 116 includes an outlet hole or aperture 122. Referring to FIGS. 3 and 4, in one exemplary embodiment, the pocket 116 includes two opposing outlet apertures 122. Referring to FIG. 5, in another exemplary embodiment, the pocket 116 includes one outlet aperture 122. In one embodiment, an outlet aperture 122 is located within the curved flow guiding connecting wall 154. In another embodiment, an outlet aperture 122 is located within the flow guiding sidewall 150. In yet another embodiment, an outlet aperture 122 is located within the flow guiding bottom wall 152. In other exemplary embodiments, the pocket 116 may include any number of outlet apertures 122 for a variety of different applications. Referring to FIG. 5, in one exemplary embodiment, the pocket 116 includes two inlet apertures 120. Referring to FIGS. 3 and 4, in one exemplary embodiment, the pocket 116 includes one inlet aperture 120. In other exemplary embodiments, the pocket 116 may include any number of inlet apertures 120 for a variety of different applications. In one embodiment, an inlet aperture 120 is located within a portion of flow guiding sidewall 150. In one embodiment, the inlet apertures 120 and the outlet apertures 122 of pocket 116 have a diameter of approximately 10 mm or less. In other embodiments, the inlet apertures 120 and the outlet apertures 122 of pocket 116 may have other sizes for a variety of different applications.

Referring to FIG. 5, in an exemplary embodiment, the pocket 116 has a triangular cross-sectional shape, though it is contemplated that the pocket 116 may have other shapes and sizes. For example, the pocket 116 can have other multi-sided polygon cross-sectional shapes. Referring to FIGS. 3-5, it is contemplated that a pocket 116 of a static portion 108 of the present disclosure can be sized, e.g., have a desired volume, to store a specific amount of lubricant for a desired application depending on a requirement of a lubricant interruption time requirement. In other words, a pocket 116 of the present disclosure can be sized, e.g., have a desired volume, for a variety of different applications and is sized to allow a sufficient percentage of the supply flow of lubricant 132 from the spraybar 110 therein.

Referring to FIGS. 2-5, in an exemplary embodiment, the gear assembly 100 includes a spraybar 110 within the static portion 108. In one embodiment, the spraybar 110 includes a supply opening 126 in communication with a supply channel 128. The supply channel 128 forms a primary lubrication system 130 that supplies a flow of lubricant 132, i.e., an inlet flow of lubricant indicated by arrows 132, through the supply channel 128 to the supply opening 126 during a working condition of the primary lubrication system 130 as described in more detail below. In an exemplary embodiment, the lubricant 132 is an oil or similar lubricant.

Referring to FIGS. 2-4, in an exemplary embodiment, the spraybar 110 is in communication with the first gear 102 and the second gear 104 such that a supply opening 126 of the spraybar 110 is directed at the first mesh 112 between the first gear 102 and the second gear 104.

Referring to FIGS. 2-4, a flow of lubricant 132 being provided to the gear assembly 100 will now be discussed. In an exemplary embodiment, the supply opening 126 of the spraybar 110 provides a flow of lubricant 132, i.e., an inlet flow of lubricant indicated by arrows 132, to the first mesh 112 between the first gear 102 and the second gear 104. Next, a portion of the lubricant after contacting the first mesh 112 between the first gear 102 and the second gear 104 flows to and is collected by the pocket 116 within the static portion 108, e.g., a flow of lubricant indicated by arrows 140 to the pocket 116. For example, during a working condition of the primary lubrication system 130, a flow of lubricant 132 travels through the supply channel 128 and out the supply opening 126 of the spraybar 110 to the first mesh 112 between the first gear 102 and the second gear 104. Next, a portion of the flow of lubricant 140 flows into the pocket 116, e.g., through inlet 120 and into pocket 116, via centrifugal force and windage effects between the first gear 102 and the second gear 104. In one embodiment, the filling of lubricant into a pocket 116 of the present disclosure corresponds to utilizing a region where a portion of the lubricant is injected. In this manner, the gear assembly 100 of the present disclosure is capable of storing a portion of the flow of lubricant 140 during a working condition of the primary lubrication system 130 within the pocket 116 of the static portion 108 for later use to lubricate the system during an interruption condition. In an exemplary embodiment, the inlet 120 of the pocket 116 is larger than the flow aperture 118 so that a flow of lubricant 132 from the supply opening 126 contacts the first mesh 112 between the first gear 102 and the second gear 104 and then the flow of lubricant indicated by arrows 140 is first collected by the pocket 116. It is contemplated that a pocket 116 of a static portion 108 of the present disclosure can be sized, e.g., have a desired volume, to store a specific amount of lubricant for a desired application depending on a requirement of a lubricant interruption time requirement. In other words, a pocket 116 of the present disclosure can be sized, e.g., have a desired volume, for a variety of different applications. In an exemplary embodiment, the flow aperture 118 allows the lubricant to be injected towards the second mesh 114 between the second gear 104 and the third gear 106 during an interruption condition.

A gear assembly 100 of the present disclosure is able to release the stored flow of lubricant 140 within the pocket 116 of the static portion 108 during an interruption condition of the primary lubrication system 130. During an interruption condition, the flow of lubricant 132 is interrupted from being provided to the supply opening 126 of the spraybar 110 by the primary lubrication system 130. In other words, the primary lubrication system 130 is in communication with the gear assembly 100 and the primary lubrication system 130 is transitionable between a working condition in which the flow of lubricant 132 is provided to the supply opening 126 and an interruption condition in which the flow of lubricant 132 is interrupted from being provided to the supply opening 126.

In an exemplary embodiment, the flow of lubricant indicated by arrows 142 is continuously released from the pocket 116, e.g., released through outlet 122, to the second mesh 114 between the second gear 104 and the third gear 106 during all conditions. As the flow of lubricant 132 is interrupted from being provided to the supply opening 126, the pockets 116 are still filled with lubrication and they continue to provide a flow of lubricant 142 to the gear system for a few seconds, depending on the size of the pocket 116. In other words, the flow of lubricant indicated by arrows 142 is released from the pocket 116 to the second mesh 114 between the second gear 104 and the third gear 106 during an interruption condition. In an exemplary embodiment, the flow of lubricant 142 is released from the pocket 116 to the second mesh 114 between the second gear 104 and the third gear 106 during an interruption condition of the primary lubrication system 130 via a pumping effect of the second gear 104 and gravity (when acting). In this manner, a gear assembly 100 of the present disclosure is able to continuously lubricate the gears 102, 104, 106 and meshes 112, 114 during an interruption condition of the primary lubrication system 130 without requiring additional parts, auxiliary systems, and/or tanks. In other words, a gear assembly 100 of the present disclosure utilizes a pocket 116 within static portion 108 to store residual lubricant and takes advantage of a fluid dynamic field generated by the gears 102, 104, 106 to allow lubrication of the system during an interruption condition through the gears 104 pumping effect and gravity (when acting). In one embodiment, the flow of lubricant 142 that is released from the pocket 116 may flow through a flow aperture 118 to the second mesh 114 between the second gear 104 and the third gear 106 during an interruption condition of the primary lubrication system 130.

In one embodiment, the flow of lubricant 142 that is released from the pocket 116 to a second mesh 114 between the second gear 104 and the third gear 106 during an interruption condition is facilitated by the second gear 104 and third gear 106 coupling having a lower amount of lubrication with respect to the first gear 102 and second gear 104 coupling. Furthermore, in such conditions, a gear assembly 100 of the present disclosure is able to lubricate, at least partially, the first mesh 112 between the first gear 102 and the second gear 104, in addition to the second mesh 114 between the second gear 104 and the third gear 106, by utilizing the rotational effects of the gear system.

Referring to FIGS. 3-4, in an exemplary embodiment, a gear assembly 100 of the present disclosure may include a plurality of second gears 104 coupled to the first gear 102. In such an embodiment, a gear assembly 100 of the present disclosure may include multiple static portions 108. For example, in one embodiment, a static portion 108 may be between each pair of adjacent second gears 104. In this manner, a gear assembly 100 of the present disclosure is able to utilize multiple pockets 116 within respective static portions 108 to store residual lubricant and take advantage of a fluid dynamic field generated by the gears 102, 104 to allow lubrication of the system during an interruption condition through the gears 104 pumping effect and gravity (when acting). In such an embodiment, the flow of lubricant 142 that is released from each pocket 116 flows to the second mesh 114 between the second gear 104 and the third gear 106 during an interruption condition of the primary lubrication system 130. The rotation of each of the second gears 104 and the third gear 106 allows lubrication to be provided to several meshes between the gears 104, 106.

Referring to FIG. 2, in an exemplary embodiment, the gear assembly 100 further includes a first shaft 134 coupled to the first gear 102. The first shaft 134 may be defined substantially concentric to the centerline axis 12. The gear assembly 100 further includes a second shaft 136. In one embodiment, the first shaft 134 is an input shaft and the second shaft 136 is an output shaft.

In one exemplary embodiment, the plurality of second gears 104 may be coupled to the second shaft 102 via a carrier. For example, in an exemplary embodiment, each second gear 104 is rotatably mounted on a portion of a carrier, e.g., a roller bearing or pin 146. As such, rotation of the first shaft 134 and the first gear 102 enables rotation of each second gear 104 around a respective second gear axis 138. Referring to FIGS. 2-4, the schematic views illustrated for a gear assembly of the present disclosure do not show the entirety of a carrier portion of the gear assembly. The gear assembly of the present disclosure is compatible with and utilize standard carrier configurations known in the art. Furthermore, in one embodiment, rotation of the second gear axis 138 around the first gear 102, i.e., around the centerline axis 12, may be enabled. In one embodiment, the second shaft 136 coupled to the second gear 104 may rotate around the centerline axis 12 along with the second gear 104. In other exemplary embodiments, the second shaft 136 may be coupled to the third gear 106. The second gear 104 may transfer energy between the first gear 102 and the third gear 106. As such, the second gear 104 may rotate about its second gear axis 138 while the second gear axis 138 remains stationary relative to the centerline axis 12, i.e., the second gear axis 138 does not rotate around the centerline axis 12.

In one exemplary embodiment, the first gear 102 is a sun gear rotatable around the centerline axis 12 of the gear assembly 100, the second gear 104 is a planet gear coupled to the sun gear, and the third gear 106 is a ring gear coupled to the planet gear. In one embodiment, the gear assembly 100 forms a part of a star gear system.

In such an embodiment, a gear carrier of the gear assembly 100 is mechanically grounded, the ring gear or third gear 106 is rotatable and the output shaft extends from the ring gear or third gear 106. Because the carrier is grounded, the planet gears or second gears 104 cannot orbit the sun gear or first gear 102 and therefore are referred to as star gears 104. In operation, the input shaft 134 rotatably drives the sun gear or first gear 102, compelling each star gear or second gear 104 to rotate about its own axis, i.e., a respective second gear axis 138. In an exemplary embodiment, each second gear 104 is rotatably mounted on a portion of a carrier, e.g., a roller bearing or pin 146. The rotary motion of the star gears or second gears 104 turn the ring gear or third gear 106, and hence the output shaft 136, in a direction opposite that of the input shaft 134.

It is contemplated that a gear assembly 100 of the present disclosed may be used with aeronautical engines, e.g., such as airplane engines or helicopter engines, and also may be applied to other mechanical or electro-mechanical systems not shown herein. In some exemplary embodiments, a gear assembly 100 generally shown and described herein may be produced using one or more manufacturing methods known in the art. For example, the gear assembly 100, including, but not limited to, the gears 102, 104, 106, a static portion 108, and/or a spraybar 110 may be manufactured via one or more processes known such as additive manufacturing or 3D printing, machining processes, forgings, castings, etc., or combinations thereof. Still further, a spraybar 110 may be formed into the gear assembly 100, such as via one or more of the processes described herein, or via a bonding process, e.g., welding, brazing, adhesive, bonding, etc., or mechanical fasteners, e.g., bolts, nuts, screws, rivets, tie rods, etc., or otherwise adhering a spraybar 110 such as shown and described in the exemplary embodiments herein. Alternatively, or additionally, various components of the gear assembly 100 may be formed via a material removal process, such as, but not limited to, a machining process, e.g., cutting, milling, grinding, boring, etc.

Further aspects of the invention are provided by the subject matter of the following clauses:

1. A gear assembly (100), comprising: a first gear (102) disposed at a centerline axis (12) of the gear assembly (100); a second gear (104) coupled to the first gear (102) in adjacent radial arrangement to form a first mesh (112) between the first gear (102) and the second gear (104); a static portion (108) coupled to the second gear (104) in adjacent circumferential arrangement, the static portion (108) defining a pocket (116); and a spraybar (110) disposed within the static portion (108) such that a supply opening (126) of the spraybar (110) is directed at the first mesh (112) between the first gear (102) and the second gear (104), wherein the supply opening (126) is configured to provide a flow of lubricant to the first mesh (112) between the first gear (102) and the second gear (104) and at least a portion of the flow of lubricant is collected by the pocket (116).

2. The gear assembly (100) of any preceding clause, further comprising: a third gear (106) coupled to the second gear (104) in adjacent radial arrangement to form a second mesh (114) between the second gear (104) and the third gear (106), wherein the flow of lubricant is released from the pocket (116) to the second mesh (114) between the second gear (104) and the third gear (106) during an interruption condition of a primary lubrication system (130) in which the flow of lubricant is interrupted from being provided to the supply opening (126), and wherein the primary lubrication system (130) provides the flow of lubricant to the supply opening (126) during a working condition.

3. The gear assembly (100) of any preceding clause, wherein the static portion (108) defines a flow aperture (118) spaced from the pocket (116), and wherein the flow of lubricant released from the pocket (116) flows through the flow aperture (118) to the second mesh (114) between the second gear (104) and the third gear (106) also during the interruption condition.

4. The gear assembly (100) of any preceding clause, wherein the pocket (116) includes an inlet (120) and an outlet (122), and wherein the inlet (120) of the pocket (116) is larger than the flow aperture (118) so that the flow of lubricant from the supply opening (126) is first collected by the pocket (116).

5. The gear assembly (100) of any preceding clause, wherein the flow of lubricant flows into the pocket (116) via centrifugal force and windage effects between the first gear (102) and the second gear (104).

6. The gear assembly (100) of any preceding clause, wherein the flow of lubricant is released from the pocket (116) to the second mesh (114) between the second gear (104) and the third gear (106) also during the interruption condition via a pumping effect of the second gear (104).

7. The gear assembly (100) of any preceding clause, wherein the first gear (102) comprises a sun gear rotatable around the centerline axis (12) of the gear assembly (100), the second gear (104) comprises a star gear coupled to the sun gear, and wherein the third gear (106) comprises a ring gear coupled to the star gear.

8. A mechanical or electro-mechanical system, comprising: an aeronautical engine (10) including a gear assembly (100), the gear assembly (100) comprising: a first gear (102) disposed at a centerline axis (12) of the gear assembly (100); a second gear (104) coupled to the first gear (102) in adjacent radial arrangement to form a first mesh (112) between the first gear (102) and the second gear (104); a static portion (108) coupled to the second gear (104) in adjacent circumferential arrangement, the static portion (108) defining a pocket (116); and a spraybar (110) disposed within the static portion (108) such that a supply opening (126) of the spraybar (110) is directed at the first mesh (112) between the first gear (102) and the second gear (104), wherein the supply opening (126) is configured to provide a flow of lubricant to the first mesh (112) between the first gear (102) and the second gear (104) and at least a portion of the flow of lubricant is collected by the pocket (116).

9. The system of any preceding clause, further comprising: a primary lubrication system (130) in communication with the gear assembly (100), the primary lubrication system (130) transitionable between a working condition in which the flow of lubricant is provided to the supply opening (126) and an interruption condition in which the flow of lubricant is interrupted from being provided to the supply opening (126).

10. The system of any preceding clause, further comprising: a third gear (106) coupled to the second gear (104) in adjacent radial arrangement to form a second mesh (114) between the second gear (104) and the third gear (106), wherein the flow of lubricant is released from the pocket (116) to the second mesh (114) between the second gear (104) and the third gear (106) also when the primary lubrication system (130) is in the interruption condition.

11. The system of any preceding clause, wherein the static portion (108) defines a flow aperture (118) spaced from the pocket (116), and wherein the flow of lubricant released from the pocket (116) flows through the flow aperture (118) to the second mesh (114) between the second gear (104) and the third gear (106) when the primary lubrication system (130) is in the interruption condition.

12. The system of any preceding clause, wherein the pocket (116) includes an inlet (120) and an outlet (122), and wherein the inlet (120) of the pocket (116) is larger than the flow aperture (118) so that the flow of lubricant from the supply opening (126) is first collected by the pocket (116).

13. The system of any preceding clause, wherein the flow of lubricant flows into the pocket (116) via centrifugal force and windage effects between the first gear (102) and the second gear (104).

14. The system of any preceding clause, wherein the flow of lubricant is released from the pocket (116) to the second mesh (114) between the second gear (104) and the third gear (106) also during the interruption condition via a pumping effect of the second gear (104).

15. The system of any preceding clause, wherein the first gear (102) comprises a sun gear rotatable around the centerline axis (12) of the gear assembly (100), the second gear (104) comprises a planet gear coupled to the sun gear, and wherein the third gear (106) comprises a ring gear coupled to the planet gear.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gear assembly comprising:
a first gear disposed at a centerline axis of the gear assembly;
a second gear coupled to the first gear to form a first mesh between the first gear and the second gear;
a third gear coupled to the second gear to form a second mesh between the second gear and the third gear;
a static portion coupled to the second gear, the static portion having a pocket; and
a primary lubrication system providing a flow of lubricant to the first mesh during an operating condition and not providing the flow of lubricant to the first mesh during an interruption condition, the primary lubrication system comprising a spraybar disposed within the static portion, the spraybar having a supply opening providing the flow of lubricant to the first mesh during the operating condition and the pocket collecting at least a portion of the flow of lubricant during the operating condition,
wherein the static portion, the second gear, the third gear, and the second mesh, define a flow aperture spaced from the pocket, the portion of the flow of lubricant flowing from the pocket through the flow aperture to simultaneously contact both the second gear and the third gear, lubricating the second mesh, such that the second gear lubricates the first mesh without the portion of the flow of lubricant first being carried on the third gear.

2. The gear assembly of claim 1, wherein the pocket includes an inlet and an outlet, and wherein the inlet of the pocket is larger than the flow aperture so that the flow of lubricant from the supply opening is first collected by the pocket.

3. The gear assembly of claim 2, the pocket further including:
a bottom wall;
a curved flow guiding connecting wall; and
a sidewall,
wherein the outlet is in communication with the pocket at either the curved flow guiding connecting wall or the sidewall.

4. The gear assembly of claim 3, wherein the outlet is in communication with the pocket and the flow aperture, and the second gear defining the flow aperture rotates from the third gear toward the first gear.

5. The gear assembly of claim 1, wherein the flow of lubricant flows into the pocket via centrifugal force and windage effects between the first gear and the second gear.

6. The gear assembly of claim 1, wherein the flow of lubricant is released from the pocket to the second mesh also during the interruption condition via a pumping effect of the second gear.

7. The gear assembly of claim 1, wherein the first gear comprises a sun gear rotatable around the centerline axis of the gear assembly, the second gear comprises a planet gear coupled to the sun gear, and the third gear comprises a ring gear coupled to the planet gear.

8. The gear assembly of claim 1, wherein the flow aperture allows the flow of lubricant to be injected towards the second mesh between the second gear and the third gear.

9. The gear assembly of claim 1, wherein the flow of lubricant is released from the pocket to the second mesh during the interruption condition.

10. A mechanical or an electro-mechanical system comprising:
an aeronautical engine including a gear assembly, the gear assembly comprising:
a first gear disposed at a centerline axis;
a second gear coupled to the first gear to form a first mesh between the first gear and the second gear;
a third gear coupled to the second gear to form a second mesh between the second gear and the third gear;
a static portion coupled to the second gear, the static portion having a pocket; and
a primary lubrication system providing a flow of lubricant to the first mesh during an operating condition and not providing the flow of the lubricant to the first mesh during an interruption condition, the primary lubrication system comprising a spraybar disposed within the static portion, the spraybar having a supply opening providing the flow of lubricant to the first mesh during the operating condition and the pocket collecting at least a portion of the flow of lubricant during the operating condition,
wherein the static portion, the second gear, the third gear, and the second mesh, define a flow aperture spaced from the pocket, the portion of the flow of lubricant flowing from the pocket through the flow aperture to simultaneously contact both the second gear and the third gear, lubricating the second mesh, such that the second gear lubricates the first mesh without the portion of the flow of lubricant first being carried on the third gear.

11. The system of claim 10, wherein the pocket includes an inlet and an outlet, and wherein the inlet of the pocket is larger than the flow aperture so that the flow of lubricant from the supply opening is first collected by the pocket.

12. The system of claim 11, the pocket further including:
a bottom wall;
a curved flow guiding connecting wall; and
a sidewall,
wherein the outlet is in communication with the pocket at either the curved flow guiding connecting wall or the sidewall.

13. The system of claim 12, wherein the outlet is in communication with the pocket and the flow aperture, and the second gear defining the flow aperture rotates from the third gear toward the first gear.

14. The system of claim 10, wherein the flow of lubricant flows into the pocket via centrifugal force and windage effects between the first gear and the second gear.

15. The system of claim 10, wherein the flow of lubricant is released from the pocket to the second mesh also during the interruption condition via a pumping effect of the second gear.

16. The system of claim 10, wherein the first gear comprises a sun gear rotatable around the centerline axis of the gear assembly, the second gear comprises a planet gear coupled to the sun gear, and wherein the third gear comprises a ring gear coupled to the planet gear.

17. The system of claim 10, wherein the flow aperture allows the flow of lubricant to be injected towards the second mesh between the second gear and the third gear.

18. The system of claim 10, wherein the flow of lubricant is released from the pocket to the second mesh during the interruption condition.

* * * * *